United States Patent
Filiz et al.

(10) Patent No.: US 10,601,945 B2
(45) Date of Patent: Mar. 24, 2020

(54) SYSTEMS AND METHODS FOR PREFETCHING CONTENT ITEMS FOR A FEED IN A SOCIAL NETWORKING SYSTEM

(71) Applicant: Facebook, Inc., Menlo Park, CA (US)

(72) Inventors: Ismail Onur Filiz, El Cerrito, CA (US); Karthik Subbian, Cupertino, CA (US); Paige Alexandra Oliver Maas, Sunnyvale, CA (US); Nicolas Emilio Stier Moses, Palo Alto, CA (US); Killian Murphy, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 145 days.

(21) Appl. No.: 15/277,888

(22) Filed: Sep. 27, 2016

(65) Prior Publication Data
US 2018/0091617 A1 Mar. 29, 2018

(51) Int. Cl.
*H04L 29/08* (2006.01)
*G06Q 10/10* (2012.01)
(Continued)

(52) U.S. Cl.
CPC ......... *H04L 67/2847* (2013.01); *G06Q 10/10* (2013.01); *G06Q 30/0241* (2013.01);
(Continued)

(58) Field of Classification Search
CPC ........ G06Q 50/01; G06Q 10/10; G06Q 30/02; G06Q 10/06; G06Q 30/016; G06Q 30/0269; G06Q 30/0201; G06Q 10/00; G06Q 30/0251; G06Q 30/0278; G06Q 50/20; G06Q 30/0255; G06Q 30/0601; G06Q 10/107; G06Q 30/00; G06Q 30/0271; G06Q 10/063; G06Q 10/0637; G06Q 30/0641; G06Q 50/06; G06Q 10/04; G06Q 10/109; G06Q 30/0202; G06Q 30/0207; G06Q 30/0254; G06Q 30/0273; G06Q 30/0631; G06Q 40/00; G06Q 40/06; G06Q 50/02; G06Q 50/14; G06Q 10/0631; G06Q 10/06398; G06Q 10/067; G06Q 10/087;
(Continued)

(56) References Cited

U.S. PATENT DOCUMENTS 8,938,500 B1 * 1/2015 Acharya ................. G06Q 50/01
705/319
9,037,692 B2 * 5/2015 Ferris ..................... G06F 9/5072
709/220
(Continued)

*Primary Examiner* — Greg C Bengzon
(74) *Attorney, Agent, or Firm* — Sheppard Mullin Richter & Hampton LLP

(57) ABSTRACT

Systems, methods, and non-transitory computer readable media can determine a time at which to prefetch one or more content items to be included in a feed associated with a user. The feed can be provided by a social networking system. A number of content items to prefetch at the determined time can be determined. One or more content items to be included in the feed associated with the user can be prefetched based at least in part on the determined time and the determined number of content items. The determined time can be prior to a time at which the user is expected to access an application associated with the social networking system.

20 Claims, 8 Drawing Sheets

(51) Int. Cl.
*H04L 12/18* (2006.01)
*G06Q 30/02* (2012.01)
*H04L 12/58* (2006.01)
*G06Q 50/00* (2012.01)

(52) U.S. Cl.
CPC ......... *G06Q 50/01* (2013.01); *H04L 12/1859* (2013.01); *H04L 51/32* (2013.01); *H04L 67/306* (2013.01)

(58) Field of Classification Search
CPC .... G06Q 10/101; G06Q 20/10; G06Q 20/202; G06Q 20/40; G06Q 20/4014; G06Q 30/0224; G06Q 30/0236; G06Q 30/0242; G06Q 30/0244; G06Q 30/0257; G06Q 30/0277; G06Q 30/0282; G06Q 30/06; G06Q 40/025; G06Q 50/184; G06Q 30/012; G06Q 30/0185; G06Q 30/0203; H04L 43/04; H04L 67/2847; H04L 67/306
See application file for complete search history.

(56) References Cited

U.S. PATENT DOCUMENTS

| | | | |
|---|---|---|---|
| 9,275,074 B1* | 3/2016 | Patel | G06F 16/9537 |
| 9,344,515 B2* | 5/2016 | Hu | H04L 67/2852 |
| 9,544,351 B1* | 1/2017 | Lee | H04L 65/608 |
| 9,628,582 B2* | 4/2017 | Hu | G06F 17/30902 |
| 9,742,866 B2* | 8/2017 | Shribman | H04L 67/06 |
| 10,117,055 B2* | 10/2018 | Frusina | H04W 4/023 |
| 2007/0201502 A1* | 8/2007 | Abramson | H04L 67/32 370/429 |
| 2010/0142447 A1* | 6/2010 | Schlicht | H04W 4/20 370/328 |
| 2010/0313227 A1* | 12/2010 | Cook | H04N 7/17318 725/96 |
| 2011/0131321 A1* | 6/2011 | Black | G06F 1/3203 709/224 |
| 2012/0023226 A1* | 1/2012 | Petersen | H04W 4/18 709/224 |
| 2012/0131184 A1* | 5/2012 | Luna | H04W 28/14 709/224 |
| 2013/0238761 A1* | 9/2013 | Raleigh | H04L 67/306 709/219 |
| 2013/0238762 A1* | 9/2013 | Raleigh | H04L 67/306 709/219 |
| 2013/0308470 A1* | 11/2013 | Bevan | H04W 64/00 370/252 |
| 2014/0095943 A1* | 4/2014 | Kohlenberg | H04W 4/029 714/47.3 |
| 2014/0113600 A1* | 4/2014 | El Gamal | H04W 28/16 455/414.3 |
| 2014/0282636 A1* | 9/2014 | Petander | H04N 21/41407 725/1 |
| 2014/0325577 A1* | 10/2014 | Garcia Mendoza | H04L 67/26 725/115 |
| 2014/0344453 A1* | 11/2014 | Varney | H04L 41/0803 709/224 |
| 2015/0033261 A1* | 1/2015 | Ellis | G06F 3/0481 725/40 |
| 2015/0067819 A1* | 3/2015 | Shribman | H04L 67/06 726/12 |
| 2015/0121413 A1* | 4/2015 | Ramakrishnan | H04W 4/70 725/25 |
| 2015/0215738 A1* | 7/2015 | Frusina | H04W 4/023 455/426.1 |
| 2015/0215816 A1* | 7/2015 | Abou-Elkheir | H04N 21/25866 370/230 |
| 2015/0278869 A1* | 10/2015 | Huang | G06Q 30/0264 705/14.61 |
| 2016/0006721 A1* | 1/2016 | Patel | H04L 63/0815 726/8 |
| 2016/0012465 A1* | 1/2016 | Sharp | G06Q 20/18 705/14.17 |
| 2016/0117739 A1* | 4/2016 | Patel | G06Q 30/0277 705/14.73 |
| 2016/0191651 A1* | 6/2016 | Balakrishnan | H04L 67/2847 709/219 |
| 2016/0191664 A1* | 6/2016 | Balakrishnan | H04L 67/306 709/203 |
| 2016/0337426 A1* | 11/2016 | Shribman | H04L 65/4084 |
| 2016/0360336 A1* | 12/2016 | Gross | H04W 4/025 |
| 2017/0046438 A1* | 2/2017 | Desineni | G06F 17/30867 |
| 2017/0279739 A1* | 9/2017 | Gamal | H04W 28/16 |
| 2017/0347236 A1* | 11/2017 | Frusina | H04M 1/72572 |
| 2017/0353516 A1* | 12/2017 | Gordon | H04N 21/8456 |
| 2018/0091617 A1* | 3/2018 | Filiz | H04L 67/2847 |
| 2019/0230186 A1* | 7/2019 | Yellin | G06F 9/44505 |

* cited by examiner

500

```
┌─────────────────────────────────────────────────────────────────────┐
│ Determine an inventory of content items associated with the user at │
│                    each time period of a day                        │
│                              502                                    │
└─────────────────────────────────────────────────────────────────────┘
                                  │
                                  ▼
┌─────────────────────────────────────────────────────────────────────┐
│ Determine a number of content items to prefetch for each time       │
│                       period of the day                             │
│                              504                                    │
└─────────────────────────────────────────────────────────────────────┘
                                  │
                                  ▼
┌─────────────────────────────────────────────────────────────────────┐
│ Generate a schedule associated with the user that includes the      │
│ number of content items to prefetch for at least one time period    │
│                          of the day                                 │
│                              506                                    │
└─────────────────────────────────────────────────────────────────────┘
```

FIGURE 5

┌─────────────────────────────────────────────────┐
│ Determining, by a computing device, a number of prefetches and
│ a prefetch time at which to prefetch one or more content items to
│ be included in a feed associated with a user, wherein the feed is
│ provided by a social networking system and the number of
│ prefetches and the prefetch time is based at least in part on a
│ network capacity associated with a region associated with the
│ user
│ 552
└─────────────────────────────────────────────────┘
                              ↓
┌─────────────────────────────────────────────────┐
│ Determining, by the computing device, a number of content items
│ to prefetch at the prefetch time, wherein the determining the
│ number of content items to prefetch is based on integer
│ programming and the network capacity associated with the
│ region associated with the user
│ 554
└─────────────────────────────────────────────────┘
                              ↓
┌─────────────────────────────────────────────────┐
│ Prefetching, by the computing device, one or more content items
│ to be included in the feed associated with the user based at least
│ in part on the prefetch time and the determined number of
│ content items, wherein the prefetch time is prior to an expected
│ time at which the user is expected to access an application
│ associated with the social networking system
│ 556
└─────────────────────────────────────────────────┘

FIGURE 5A

SYSTEMS AND METHODS FOR PREFETCHING CONTENT ITEMS FOR A FEED IN A SOCIAL NETWORKING SYSTEM

FIELD OF THE INVENTION

The present technology relates to the field of social networks. More particularly, the present technology relates to techniques for providing and downloading content items in social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide user profiles for various users through which users may add friends or contacts, or provide, post, or publish content items. In one example, a user (or entity) of the social networking system can post or publish a content item, which can be provided or presented on a profile page, such as on the user's timeline or on another user's timeline. In another example, the content item can be provided or presented through a feed, such as a newsfeed, for the user or for another user to view and access. The user can interact with a content item in the feed, for example, by liking the content item, commenting on the content item, sharing the content item, etc. Content items presented in the feed for the user can be determined based on various factors.

SUMMARY

Various embodiments of the present disclosure can include systems, methods, and non-transitory computer readable media configured to determine a time at which to prefetch one or more content items to be included in a feed associated with a user. The feed can be provided by a social networking system. A number of content items to prefetch at the determined time can be determined. One or more content items to be included in the feed associated with the user can be prefetched based at least in part on the determined time and the determined number of content items. The determined time can be prior to a time at which the user is expected to access an application associated with the social networking system.

In some embodiments, a plurality of users are clustered into one or more groups of users based on a usage pattern associated with feeds associated with the plurality of users, and the user is associated with a first group of the one or more groups.

In certain embodiments, the time at which to prefetch and the number of content items to prefetch are determined for the first group.

In an embodiment, the determining the time at which to prefetch and the determining the number of content items to prefetch are based on integer programming.

In some embodiments, the integer programming is linear programming.

In certain embodiments, the time at which to prefetch and the number of content items to prefetch are determined to minimize staleness of content items associated with the feed.

In an embodiment, the time at which to prefetch is a particular time period of a day and the number of content items to prefetch is associated with the particular time period, and a number of content items to prefetch is determined for each time period of the day, wherein the day includes one or more time periods.

In some embodiments, a schedule associated with the user that includes the number of content items to prefetch for at least one time period of the day is generated.

In certain embodiments, an inventory of content items associated with the user at a selected time period of the day is determined based on an inventory of content items associated with the user at a time period preceding the selected time period, the number of content items to prefetch for the selected time period, and consumption data associated with the user for the selected time period, wherein the consumption data indicates a number of content items consumed by the user for the selected time period.

In an embodiment, the time at which to prefetch and the number of content items to prefetch are determined subject to one or more constraints that apply to a plurality of users, wherein the plurality of users includes the user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example third method for prefetching content items associated with a feed, according to an embodiment of the present disclosure.

FIG. 5A illustrates an example fourth method for prefetching content items associated with a feed, according to an embodiment of the present disclosure.

Figure 1:
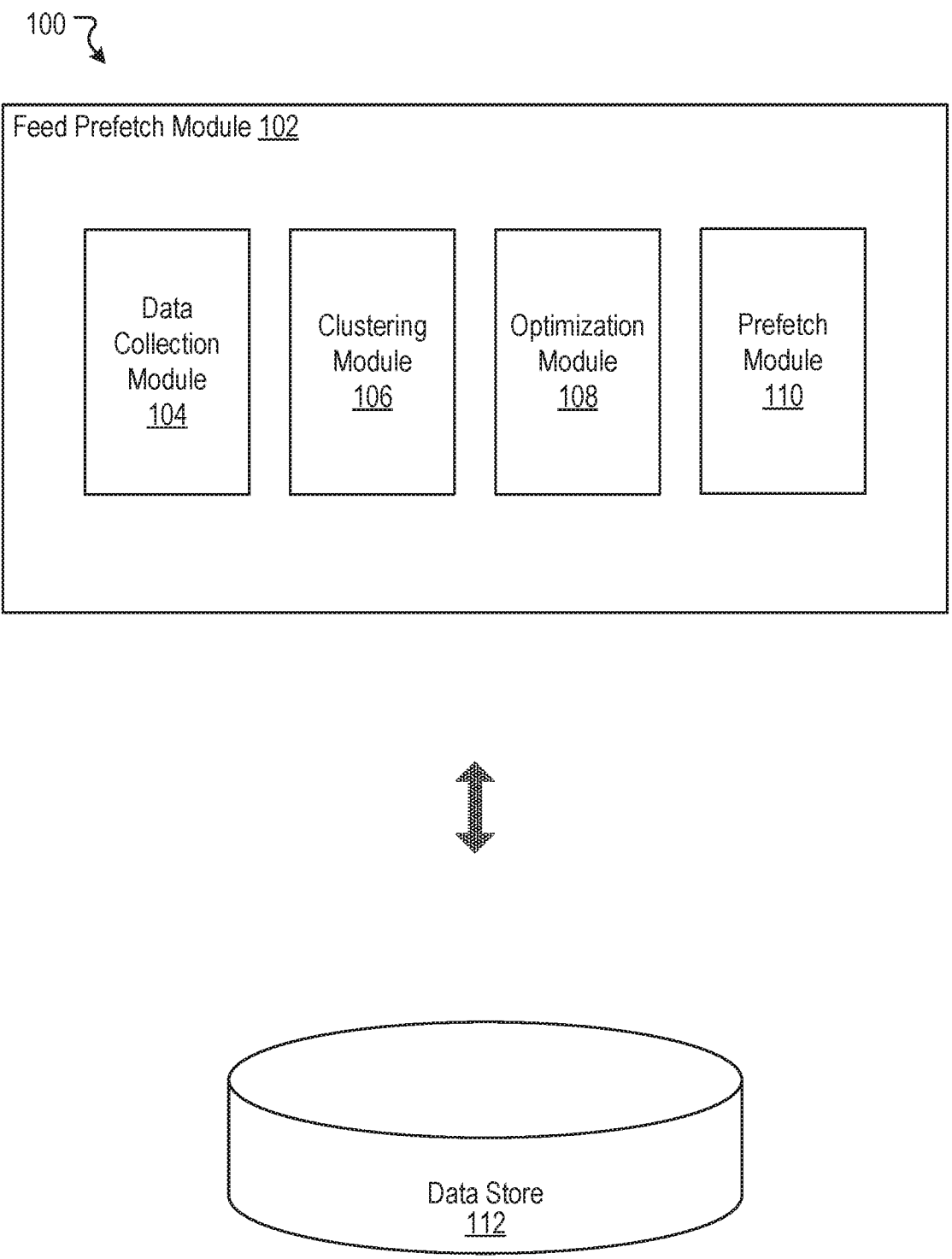
FIG. 1 illustrates a system including an example feed prefetch module configured to prefetch content items associated with a feed, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Prefetching Content Items for a Feed in a Social Networking System

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide user profiles for various users through which users may add friends or contacts, or provide, post, or publish content items. In one example, a user (or entity) of the social networking system can post or publish a content item, which can be provided or presented on a profile page, such as on the user's timeline or on another user's timeline. In another example, the content item can be provided or presented through a feed, such as a newsfeed, for the user or for another user to view and access. The user can interact with a content item in the feed, for example, by liking the content item, commenting on the content item, sharing the content item, etc. Content items presented in the feed for the user can be determined based on various factors. Content items included in a user's feed can be referred to as "feed content items."

Feed content items for a user's feed can be obtained from a server associated with the social networking system when the user accesses an application (or "app") associated with the social networking system. However, in case of low network communications connectivity, downloading feed content items to the device of the user can take a long period of time. Low connectivity can exist for various reasons. For example, a particular region may lack infrastructure for high speed network connection. Or a particular device may not support high speed network connection. In case of low connectivity, conventional approaches specifically arising in the realm of computer technology may result in high latency associated with downloading feed content items. However, such latency can lead to an unsatisfactory user experience.

An improved approach rooted in computer technology can overcome the foregoing and other disadvantages associated with conventional approaches specifically arising in the realm of computer technology. Based on computer technology, the disclosed technology can prefetch one or more feed content items for a user's feed. Prefetching can refer to downloading of content items onto a user's device prior to a time the user is expected to access an application associated with the social networking system. When a user accesses the application or the app, feed content items that have been prefetched can be displayed in the user's feed. The disclosed technology can determine when to prefetch feed content items and how many feed content items to prefetch. For example, one or more times throughout the day at which feed content items should be prefetched can be determined. The one or more times can be referred to as "time(s) to prefetch." For each of the one or more times to prefetch, the number of feed content items that should be prefetched can be determined. The number of feed content items can be referred to as a "number to prefetch."

Times to prefetch and corresponding numbers to prefetch can be determined based on one or more usage patterns associated with users' feeds. For example, a usage pattern can indicate a user's consumption of content items in the user's feed. The times to prefetch and the numbers to prefetch can be determined for an individual user, a group of users, etc. Users can be clustered into one or more groups based on usage patterns associated with users' feeds.

The times to prefetch and the numbers to prefetch can be determined in a manner that minimizes staleness of feed content items. Staleness can refer to how much time passed between a time at which a feed content item was prefetched and a time at which the feed content item was consumed by a user. The more time passes between the prefetch and the consumption, the more stale a feed content item becomes. In some cases, staleness can be described in terms of an inventory of feed content items at a particular time, as explained further below. Minimizing staleness of feed content items can also be described as maximizing freshness of feed content items. The times to prefetch and the numbers to prefetch can be optimized for minimum staleness (or for maximum freshness). In one example, the times to prefetch and the numbers to prefetch can be determined based on integer programming. Decision variables, an objective function, and constraints can be defined for integer programming.

In this way, the disclosed technology can prefetch one or more feed content items prior to one or more times a user is expected to access an application or an app associated with the social networking system. Due to the prefetch, at least some feed content items can be immediately available when the user accesses the application. This can lead to an improved user experience in case of low connectivity.

FIG. 1 illustrates an example system 100 including an example feed prefetch module 102 configured to prefetch content items associated with a feed, according to an embodiment of the present disclosure. The feed prefetch module 102 can include a data collection module 104, a clustering module 106, an optimization module 108, and a prefetch module 110. In some instances, the example system 100 can include at least one data store 112. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the feed prefetch module 102 can be implemented in any suitable combinations.

The data collection module 104 can collect data or statistics that can be used in determining times to prefetch and numbers to prefetch associated with users' feeds provided by a social networking system. Such data or statistics can include historical data. Data or statistics collected or provided by the data collection module 104 can include consumption data associated with users. Consumption data can indicate how many feed content items one or more users consume (e.g., access, review, watch, read, hear, etc.). Consumption data can indicate consumption for an individual user, a group of users, or all users of the social networking system. Consumption data can indicate actual consumption or average consumption, for example, over a period of time. Data or statistics collected or provided by the data collection module 104 can also include capacity data. Capacity data can indicate a capacity of a network or other resources, for example, for processing prefetches. For example, capacity data can indicate capacity information and/or restrictions at point-of-presence (PoP) level, at user group level, at user level, etc. Consumption data and capacity data are explained in more detail below. The data collection module 104 can also collect other data or statistics that are relevant to determining the times to prefetch and the numbers to prefetch. Many variations are possible.

The clustering module 106 can determine one or more clusters of users that can be used in determining times to prefetch and numbers to prefetch. As mentioned above, usage patterns can indicate trends, cycles, or other patterns regarding one or more users' consumption of feed content items. For example, some users tend to access an application or an app associated with the social networking system in the morning, whereas other users tend to access the application or the app in the evening. Users can be grouped or clustered into one or more clusters based on usage patterns associated with the users. Users who have a similar or the same usage pattern can be grouped into one cluster. The size of a cluster or the number of users included in a cluster can be adjusted as appropriate. Various features can be considered in determining clusters. Examples of features that can be considered in determining clusters can include a time at which a user accesses the application or the app, an amount of feed content items a user consumes at a particular time, an amount of content items posted by a user, an amount of notifications received by a user, the gender of a user, the age of a user, whether a user is traveling, etc. The times to prefetch and the numbers to prefetch can be determined for each cluster. Users in the same cluster can share the same times to prefetch and numbers to prefetch. In some embodiments, the clustering module 106 can determine one or more clusters based on machine learning techniques. Users can have different usage patterns for weekdays as opposed to weekends. Accordingly, clusters can be determined differently for weekdays and weekends. Further, users can have different usage patterns in different regions (e.g., countries, states, counties, cities, etc). Accordingly, usage patterns can be obtained for each region, and clusters can be determined on a regional basis. In some embodiments, users may not be clustered, and the times to prefetch and the numbers to prefetch can be determined for an individual user.

The optimization module 108 can determine times to prefetch and numbers to prefetch. For example, the optimization module 108 can determine the times to prefetch and the numbers to prefetch to optimize for minimum staleness of feed content items (or maximum freshness of feed content items). The optimization module 108 can generate schedules that indicate the times to prefetch and the numbers to prefetch. The optimization module 108 is described in more detail herein.

The prefetch module 110 can prefetch feed content items associated with users' feeds based on determined times to prefetch and numbers to prefetch. For example, the prefetch module 110 can prefetch the feed content items according to schedules output by the optimization module 108. In some embodiments, an appropriate schedule may be sent to a device of a user, and the device can prefetch feed content items for the user's feed based on the schedule. Based at least in part on the prefetched feed content items, the feed can be presented to the user through a suitable interface supported by the device. In other embodiments, a server associated with the social networking system can prefetch the feed content items based on a schedule associated with a user and push the feed content items to a device of the user based on the schedule.

In some embodiments, the feed prefetch module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the feed prefetch module 102 can be, in part or in whole, implemented as software running on one or more computing devices or systems, such as on a server system or a client computing device. In some instances, the feed prefetch module 102 can be, in part or in whole, implemented within or configured to operate in conjunction or be integrated with a social networking system (or service), such as a social networking system 630 of FIG. 6. Likewise, in some instances, the feed prefetch module 102 can be, in part or in whole, implemented within or configured to operate in conjunction or be integrated with a client computing device, such as the user device 610 of FIG. 6. For example, the feed prefetch module 102 can be implemented as or within a dedicated application (e.g., app), a program, or an applet running on a user computing device or client computing system. It should be understood that many variations are possible.

The data store 112 can be configured to store and maintain various types of data, such as the data relating to support of and operation of the feed prefetch module 102. The data maintained by the data store 112 can include, for example, information relating to users' feeds, feed content items, times to prefetch, numbers to prefetch, schedules for prefetch, user clusters, optimization data, decision variables, objective functions, constraints, consumption data, capacity data, statistics, etc. The data store 112 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the feed prefetch module 102 can be configured to communicate and/or operate with the data store 112. In some embodiments, the data store 112 can be a data store within a client computing device. In some embodiments, the data store 112 can be a data store of a server system in communication with the client computing device.

Figure 2:
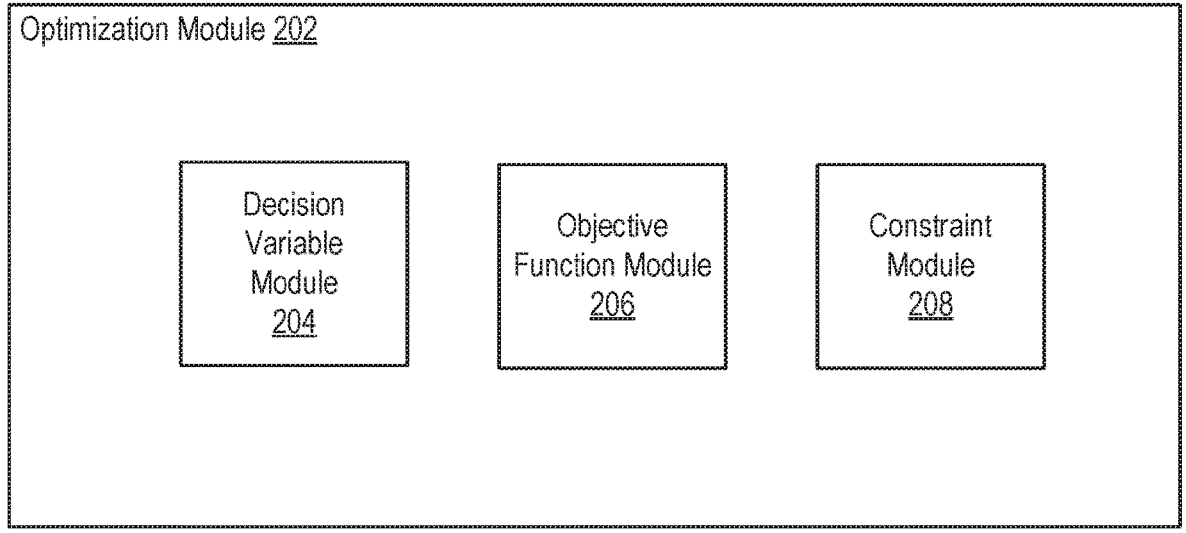
FIG. 2 illustrates an example optimization module configured to optimize a number of stories to prefetch, according to an embodiment of the present disclosure.

FIG. 2 illustrates an example optimization module 202 configured to optimize a number of feed content items to prefetch, according to an embodiment of the present disclosure. In some embodiments, the optimization module 108 of FIG. 1 can be implemented with the optimization module 202. As shown in the example of FIG. 2, the optimization module 202 can include a decision variable module 204, an objective function module 206, and a constraint module 208.

As mentioned above, the optimization module 202 can determine times to prefetch and numbers to prefetch to optimize for minimum staleness of feed content items (or maximum freshness of feed content items). The optimization module 202 can use mathematical programming in order to optimize for minimum staleness of feed content items. For example, the optimization module 202 can use linear or integer programming. In some embodiments, determining times to prefetch and numbers to prefetch can be formulated as an integer programming problem. An integer programming problem can be defined by one or more decision variables, an objective function, and one or more constraints. The optimization module 202 can define decision variables, an objective function, and constraints for integer programming, which is explained in more detail below. The optimization module 202 can generate an output that includes values for decision variables based on the objective function and the constraints. The optimization module 202 can use an optimization framework for integer programming. For example, the optimization module 202 can provide the decision variables, the objective function, and the constraints to the optimization framework, and the optimization framework can generate the output.

The decision variable module 204 can define one or more decision variables to be used in optimization. The optimization framework can output values for decision variables, for example, according to the objective function and constraints. With respect to determining times to prefetch and numbers to prefetch, decision variables can include inventory for hour n, inventory for hour n−1, and number of feed content items to prefetch for hour n. Decision variables are explained in terms of hours for illustrative purposes, and a selected time period or unit(s) of time can be used as appropriate (e.g., day(s), hour(s), minute(s), second(s), etc.). Inventory can refer to the number of feed content items available for a user. The inventory can be considered in terms of an inventory for each hour, for example, in a day. A day is provided as an example, and a selected timeframe can be used as appropriate (e.g., day(s), hour(s), minute(s), second(s), etc.). Inventory for hour n can refer to the inventory at an nth hour, and inventory for hour n−1 can refer to the inventory at an n−1th hour. The number of feed content items to prefetch for hour n can refer to the number of feed content items to prefetch at an nth hour. Decision variables can be denoted as follows: inv n=inventory for hour n; inv n−1=inventory for hour n−1; # of content items n=number of feed content items to prefetch for hour n.

The objective function module 206 can define an objective function to be used in optimization. An objective function can refer to an expression that is to be maximized or minimized. With respect to determining times to prefetch and numbers to prefetch, the objective function can be minimizing staleness of feed content items. As mentioned above, staleness of feed content items can be described in terms of an inventory of feed content items at a particular time. In one example, staleness can be expressed as follows:

$$\text{inv } n = \text{inv } n-1 + \text{\# of content items } n - \text{consumption } n \quad (1),$$

where consumption n indicates the number of feed content items a user consumes at an nth hour. Equation (1) is provided as an example of an expression relating to staleness, and many variations are possible. For example, weighted staleness can be used, and one or more hours of the day can be weighted based on an importance of the hours. As another example, one or more feed content items can be weighted based on an importance of the feed content items. Staleness is provided as an example of what can be maximized or minimized by an objective function, and there can be other variations and possibilities. Equation (1) can be a constraint used in optimization, as explained below. Based on equation (1), the objective function for minimizing staleness of feed content items can be described as follows:

$$\min \sum_{n=1}^{24} \text{inv } n \quad (2)$$

The sum of inventory for hour 1 through hour 24 can be minimized, which can be equivalent to minimizing staleness of feed content items in the inventory on a particular day.

The constraint module 208 can define one or more constraints to be used in optimization. Constraints can define one or more conditions that should be satisfied while maximizing or minimizing the objective function. Some constraints can indicate relationships between one or more decision variables. Constraints can include equality constraints or inequality constraints. Constraints can be defined and applied at various levels, such as an individual user level, a user group level, a global level, etc. Global constraints can apply to all users or all users in a relevant context. In one example, all users in a relevant context can be all users in a particular region, such as a country, state, county, city, etc. User group level constraints can be defined at the level of a group of users, which can be a cluster as explained above. Constraints can be defined based on various types of data, such as consumption data, capacity data, etc. For example, constraints can be defined based on consumption data, capacity data, and other data or statistics provided by the data collection module 104, as described above.

In some embodiments, the constraint module 208 can define constraints for determining times to prefetch and numbers to prefetch as described below. One constraint can be defined as follows:

$$\text{inv } n = \text{inv } n-1 + \text{\# of content items } n - \text{consumption } n \quad (3)$$

Equation (3) is the same as equation (1) and can be a constraint used in optimization. Equation (3) can indicate a relationship between decision variables inv n, inv n−1, and # of content items n. Consumption n can be determined or estimated based on consumption data. For example, consumption data can be provided by the data collection module 104. Equation (3) can also indicate a relationship between the decision variables and consumption n. Other constraints can indicate that certain numbers cannot be negative. For example, the number of feed content items to prefetch for hour n and the inventory for hour n should be greater than or equal to 0. Such constraints can be defined as follows:

$$\text{\# of content items } n \geq 0 \quad (4)$$

$$\text{inv } n \geq 0 \quad (5)$$

Another constraint can indicate a maximum number of prefetches for a user (or a group of users). For example, prefetching of feed content items should not occur too often since prefetching frequently can create a strain on network communication resources. Accordingly, a constraint can be defined to place a cap on how many prefetches can be performed for a user (or a group of users). Such constraint can be defined as follows:

$$\sum_{n=1}^{24} \text{prefetch } n \leq \max \text{ prefetch}, \quad (6)$$

where prefetch n indicates the number of prefetches at an nth hour for a particular user (or group of users), and where max prefetch indicates the maximum number of prefetches for the particular user (or group of users) for a day. Equation (6) can describe that the sum of prefetches for hour 1 through hour 24 should be less than or equal to the maximum number of prefetches. In one example, prefetch n can be a binary variable that keeps track of the number of prefetches for a user (or a group of users) at an nth hour. For instance, prefetch n can be 0 if a prefetch did not occur at an nth hour, and prefetch n can be 1 if a prefetch occurred at an nth hour. The decision variable # of content items n can indicate the number of feed content items to prefetch at an nth hour and therefore can indicate whether a prefetch occurred at an nth hour. Accordingly, the value of prefetch n can be 1 if # of content items n>0, and the value of prefetch n can be 0 if otherwise. The maximum number of prefetches for a particular user (or group of users) can be set and adjusted based on a usage pattern associated with the user, consumption data associated with the user, etc. For example, for a user who accesses an application or an app associated with a social networking system once a day, the maximum number of prefetches can be set to 1. As another example, for a user who accesses the application frequently (e.g., at a selected frequency value), the maximum number of prefetches can be set to a selected, higher number.

As explained above, constraints can be applied at various levels. The constraints described by equations (3) through (6) can be user-level constraints or user group-level constraints since they can be applied for, respectively, an individual user or for a group of users (e.g., a cluster). The constraint module 208 can also define global constraints. For example, the constraint module 208 can define a global constraint based on a capacity of a network at the PoP level. For example, the number of prefetches for users in a particular time period can be limited due to network capacity. In such case, the maximum number of prefetches for an nth hour within the particular time period can be defined as a global constraint for all relevant users. For example, the global constraint can be similar to the constraint described by equation (6), but can be for all users in a relevant context, such as a particular region. In some cases, the global constraint can be defined in terms of number of feed content items to prefetch for users in a particular time period. For example, the global constraint can be defined as a maximum number of feed content items to prefetch for users at an nth hour. Other global constraints can be defined as appropriate. As explained above, constraints can be defined based on various types of data, such as data or statistics provided by the data collection module 104. For example, a global constraint and the constraint described by equation (6) can be constraints based on capacity data. The constraint described by equation (1) can be a constraint based on consumption data.

The decision variables, objective function, and constraints as described above can define an integer programming problem. The optimization module 202 can provide the decision variables, objective function, and constraints to the optimization framework, and the optimization framework can solve the integer programming problem. The optimization framework can output values for the decision variables that optimize the objective function subject to the constraints. With respect to determining times to prefetch and numbers to prefetch, the decision variable of interest can be # of content items n. The optimization framework can output the number of feed content items to prefetch for each hour n in a day (e.g., n=1 through n=24). For example, the output from the optimization framework can be in the form of a schedule. The schedule can indicate the number of feed content items to prefetch for each hour of a day or certain hours of a day. The optimization framework can determine the number of feed content items to prefetch for each hour n such that prefetching of feed content items can occur as close as possible to consumption of feed content items. In this way, the optimization framework can minimize staleness of feed content items.

In various embodiments, times to prefetch and numbers to prefetch can be determined for each user or a group of users (e.g., a cluster). If times to prefetch and numbers to prefetch are determined for each user, the optimization module 202 can define an integer programming problem for each user and provide corresponding decision variables, an objective function, and constraints to the optimization framework. The optimization framework can output values for the decision variables for each user. Similarly, if times to prefetch and numbers to prefetch are determined for one or more groups of users, the optimization module 202 can define an integer programming problem for each group of users and provide corresponding decision variables, an objective function, and constraints to the optimization framework. The optimization framework can output values for the decision variables for each group of users.

As mentioned above, constraints can be global constraints that apply to all users or all users in a relevant context. By specifying global constraints, the optimization module 202 can solve integer programming problems for individual users or groups of users in view of capacity of resources or other conditions that can affect all users or all relevant users. For example, a capacity of a network may not allow more than a certain number of prefetches in a region or may not allow more than a download of a certain number of feed content items in a region. By solving the integer programming problems for users or groups of users in the region subject to global constraints, any capacity restrictions can be taken into account. For example, times to prefetch for different users or groups of users can be staggered over time in order to prevent prefetches for all users from happening at the same time. Global constraints can reflect any type of condition or factor that can affect all users or all relevant users. All examples herein are provided for illustrative purposes, and there can be many variations and other possibilities.

Figure 3:
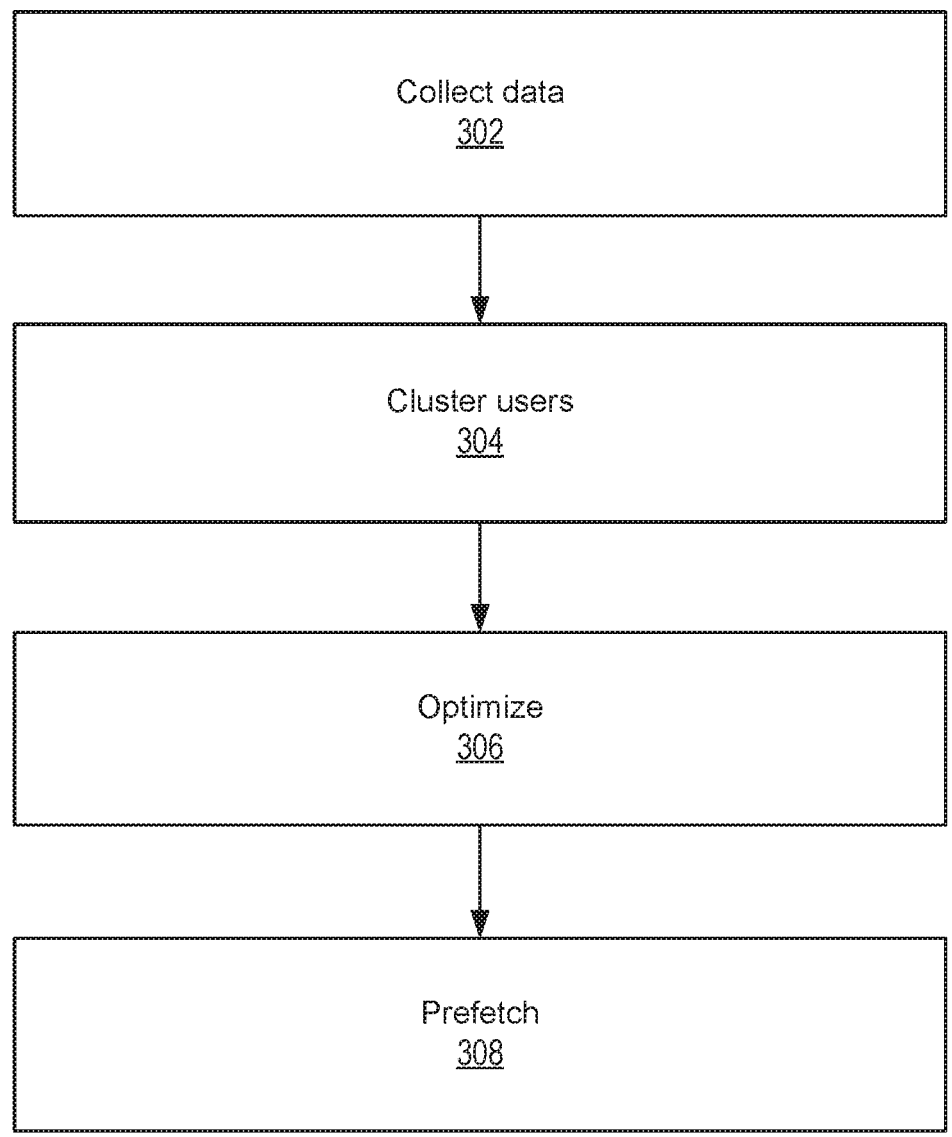
FIG. 3 illustrates an example first method for prefetching content items associated with a feed, according to an embodiment of the present disclosure.

FIG. 3 illustrates an example first method 300 for prefetching content items associated with a feed, according to an embodiment of the present disclosure. It should be understood that there can be additional, fewer, or alternative steps performed in similar or alternative orders, or in parallel, based on the various features and embodiments discussed herein unless otherwise stated.

At block 302, the example method 300 can collect data. Data can include any type of data that can be used in determining times to prefetch and numbers to prefetch. For example, the data can include capacity data and consumption data, as explained above. At block 304, the example method 300 can cluster users. Users can be clustered into one or more groups (e.g., clusters) based on usage patterns associated with the users. At block 306, the example method 300 can optimize an inventory of feed content items over a period of time. For example, a sum of an inventory of feed content items for each hour of a day can be optimized for minimum staleness of feed content items. The number to prefetch for each hour can be determined based on the inventory of feed content items for each hour. At block 308, the example method 300 can prefetch feed content items. Feed content items associated with feeds for users can be prefetched according to the determined times to prefetch and numbers to prefetch. Other suitable techniques that incorporate various features and embodiments of the present disclosure are possible.

Figure 4:
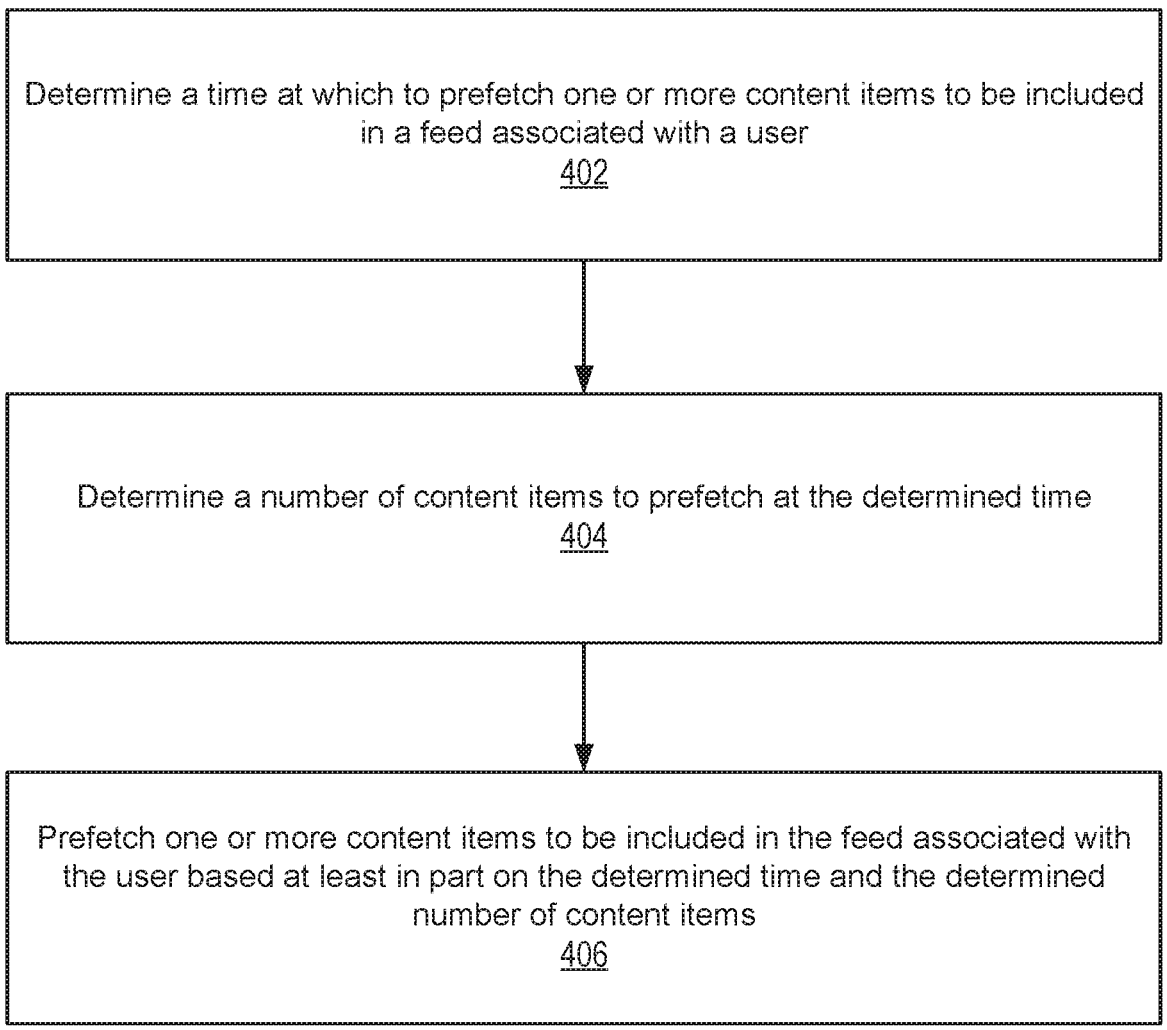
FIG. 4 illustrates an example second method for prefetching content items associated with a feed, according to an embodiment of the present disclosure.

FIG. 4 illustrates an example second method 400 for prefetching content items associated with a feed, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can determine a time at which to prefetch one or more content items to be included in a feed associated with a user, where the feed is provided by a social networking system. At block 404, the example method 400 can determine a number of content items to prefetch at the determined time. The user can belong to or be associated with a group of users (e.g., a group of users for a particular country), and the time at which to prefetch and the number of content items to prefetch at the determined time can be determined for the group of users. At block 406, the example method 400 can prefetch one or more content items to be included in the feed associated with the user based at least in part on the determined time and the determined number of content items, wherein the determined time is prior to a time at which the user is expected to access an application associated with the social networking system. Other suitable techniques that incorporate various features and embodiments of the present disclosure are possible.

FIG. 5 illustrates an example third method 500 for prefetching content items associated with a feed, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can determine an inventory of content items associated with the user at each time period of a day. The day can include one or more time periods. A time period can be selected as appropriate. In some embodiments, the time period can be an hour. The user can be similar to the user explained in connection with FIG. 4. For example, the inventory of content items associated with the user at a selected time period of the day is determined based on an inventory of content items associated with the user at a time period preceding the selected time period, the number of content items to prefetch for the selected time period, and consumption data associated with the user for the selected time period, wherein the consumption data indicates a number of content items consumed by the user for the selected time period. At block 504, the example method 500 can determine a number of content items to prefetch for each time period of the day. For example, the time at which to prefetch can be a particular time period of a day and the number of content items to prefetch at the determined time can be associated with the particular time period, and a number of content items to prefetch for each time period of the day can be determined. The time at which to prefetch and the number of content items to prefetch at the determined time can be similar to the time at which to prefetch and the number of content items to prefetch at the determined time explained in connection with FIG. 4. At block 506, the example method 500 can generate a schedule associated with the user that includes the number of content items to prefetch for at least one time period of the day. Other suitable techniques that incorporate various features and embodiments of the present disclosure are possible.

FIG. 5A illustrates an example fourth method 550 for prefetching content items associated with a feed, according to an embodiment of the present disclosure. At block 552, the example method 550 includes determining, by a computing device, a number of prefetches and a prefetch time at which to prefetch one or more content items to be included in a feed associated with a user, wherein the feed is provided by a social networking system and the number of prefetches and the prefetch time is based at least in part on a network capacity associated with a region associated with the user. At block 554, the example method 550 includes determining, by the computing device, a number of content items to prefetch at the prefetch time, wherein the determining the number of content items to prefetch is based on integer programming and the network capacity associated with the region associated with the user. At block 556, the example method 550 includes prefetching, by the computing device, one or more content items to be included in the feed associated with the user based at least in part on the prefetch time and the determined number of content items, wherein the prefetch time is prior to an expected time at which the user is expected to access an application associated with the social networking system. It should be understood that there can be additional, fewer, or alternative steps performed in similar or alternative orders, or in parallel, based on the various features and embodiments discussed herein unless otherwise stated.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
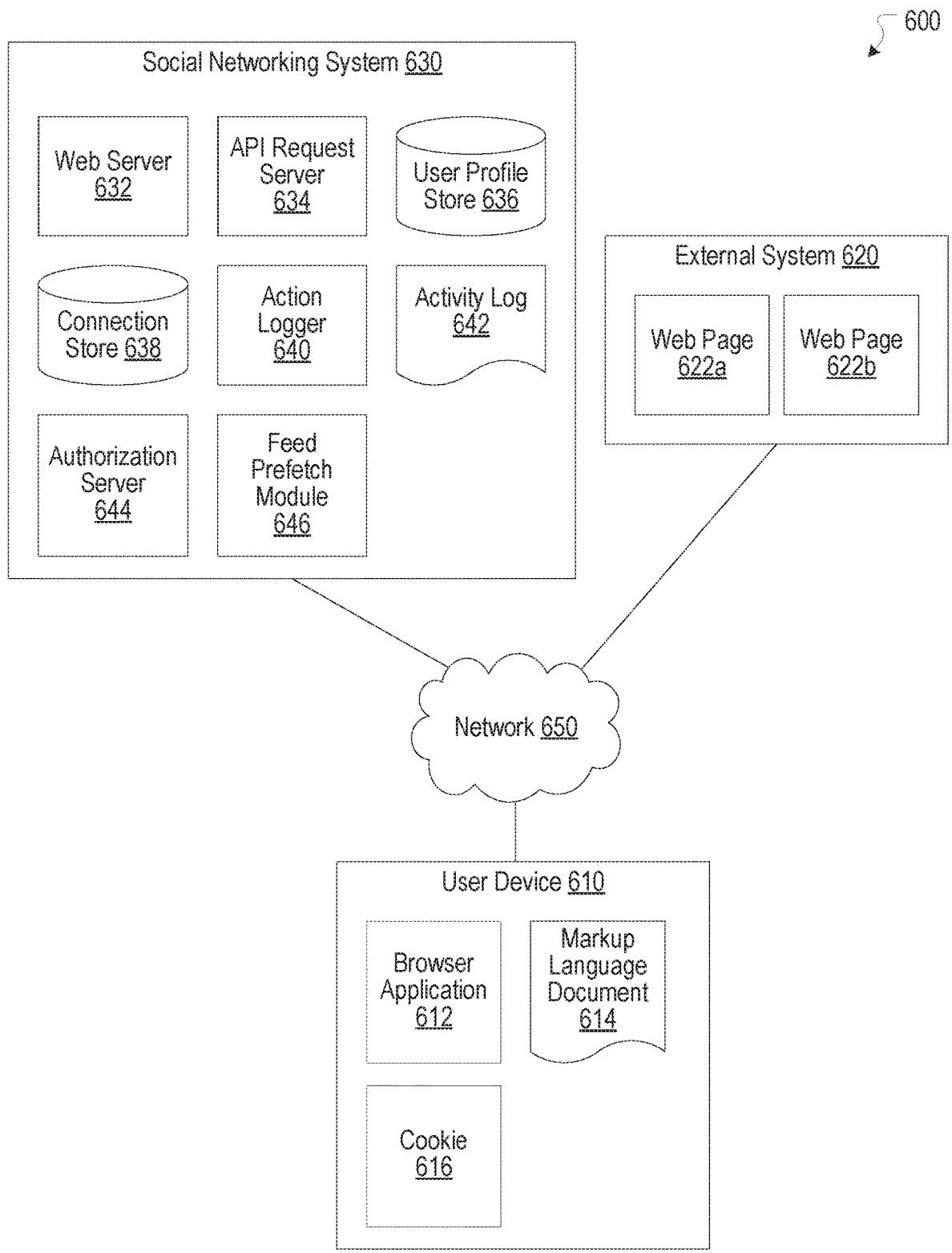
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a feed prefetch module 646. The feed prefetch module 646 can be implemented with the feed prefetch module 102, as discussed in more detail herein. In some embodiments, one or more functionalities of the feed prefetch module 646 can be implemented in the user device 610.

Hardware Implementation

Figure 7:
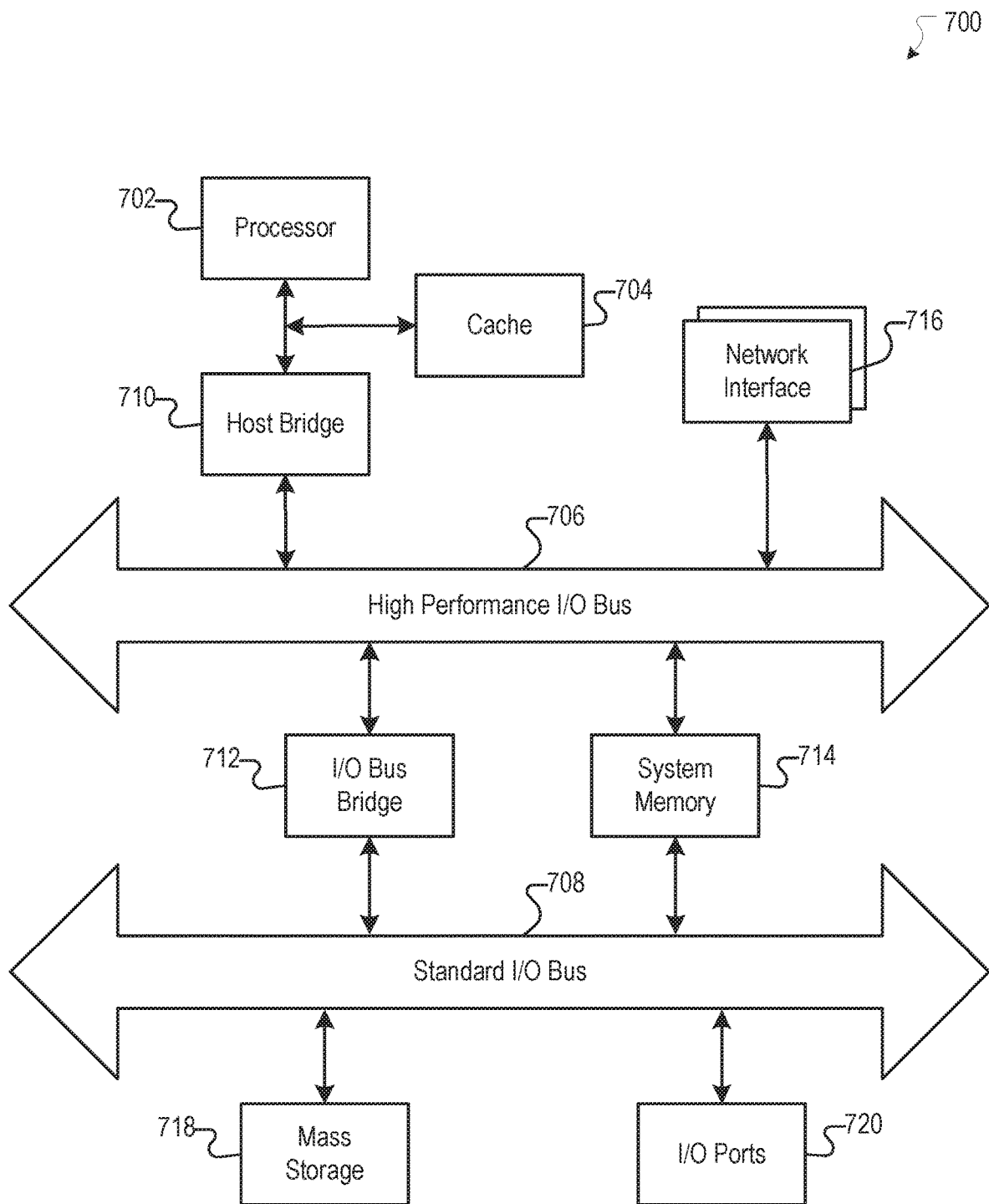
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a first global constraint associated with a number of prefetches and a second global constraint associated with one or more prefetch times for a region based at least in part on a network capacity associated with the region;
   determining, by the computing system, the number of prefetches and the prefetch times at which to prefetch one or more content items to be included in feeds associated with a first group of one or more groups of users, wherein the feeds are provided by a social networking system, the first group of users is grouped based at least in part on usage patterns of the feeds associated with users of the first group of users, the number of prefetches and the prefetch times are based at least in part on the first global constraint, and the second global constraint and the prefetch times associated with the first group of users are staggered with other prefetch times associated with one or more other groups of users;
   determining, by the computing system, a number of content items to prefetch for the first group at the prefetch times, wherein the determining the number of content items to prefetch is based on integer programming; and
   prefetching, by the computing system, the one or more content items to be included in the feeds associated with the first group of users based at least in part on the prefetch times and the determined number of content items, wherein the prefetch times are prior to an expected time at which the first group of users is expected to access an application associated with the social networking system.

2. The computer-implemented method of claim 1, further comprising clustering a plurality of users into the one or more groups of users based on usage patterns associated with a plurality of feeds associated with the plurality of users.

3. The computer-implemented method of claim 2, wherein the prefetch times at which to prefetch and the number of content items to prefetch are determined for the first group of users.

4. The computer-implemented method of claim 1, wherein the determining the prefetch times at which to prefetch is based on integer programming.

5. The computer-implemented method of claim 4, wherein the integer programming is linear programming.

6. The computer-implemented method of claim 1, wherein the prefetch times at which to prefetch and the number of content items to prefetch are determined to minimize staleness of content items associated with the feeds.

7. The computer-implemented method of claim 1, wherein the prefetch times at which to prefetch are particular time periods of a day and the number of content items to prefetch is associated with the particular time periods, and wherein the day includes a plurality of time periods and the method further comprises determining a number of content items to prefetch for each time period of the plurality of time periods.

8. The computer-implemented method of claim 7, further comprising generating a schedule associated with a user of the first group of users that includes the number of content items to prefetch for each time period of the plurality of time periods.

9. The computer-implemented method of claim 7, wherein a first inventory of content items associated with a user of the first group of users at a selected time period of the day is determined based on a second inventory of content items associated with the user at a time period preceding the selected time period, the number of content items to prefetch for the selected time period, and consumption data associated with the user for the selected time period, wherein the consumption data indicates a number of content items consumed by the user for the selected time period.

10. The computer-implemented method of claim 1, wherein the prefetch times at which to prefetch and the number of content items to prefetch are determined subject to one or more constraints.

11. A system comprising:
at least one hardware processor; and
a memory storing instructions that, when executed by the at least one processor, cause the system to perform:
determining a first global constraint associated with a number of prefetches and a second global constraint associated with one or more prefetch times for a region based at least in part on a network capacity associated with the region;
determining the number of prefetches and the prefetch times at which to prefetch one or more content items to be included in feeds associated with a first group of one or more groups of users, wherein the feeds are provided by a social networking system, the first group of users is grouped based at least in part on usage patterns of the feeds associated with users of the first group of users, the number of prefetches and the prefetch times are based at least in part on the first global constraint, and the second global constraint and the prefetch times is staggered with other prefetch times associated with the first group of users are staggered with other prefetch times associated with one or more other groups of users;
determining a number of content items to prefetch for the first group at the prefetch times, wherein the determining the number of content items to prefetch is based on integer programming; and
prefetching the one or more content items to be included in the feeds associated with the first group of users based at least in part on the prefetch times and the determined number of content items, wherein the prefetch times are prior to an expected time at which the first group of users is expected to access an application associated with the social networking system.

12. The system of claim 11, wherein the prefetch times at which to prefetch and the number of content items to prefetch are determined to minimize staleness of content items associated with the feeds.

13. The system of claim 11, wherein the prefetch times at which to prefetch are particular time periods of a day and the number of content items to prefetch is associated with the particular time periods, and wherein the day includes a plurality of time periods and the instructions further cause the system to perform determining a number of content items to prefetch for each time period of the plurality of time periods.

14. The system of claim 13, wherein the instructions further cause the system to perform generating a schedule associated with a user of the first group of users that includes the number of content items to prefetch for each time period of the plurality of time periods.

15. The system of claim 13, wherein a first inventory of content items associated with a user of the first group of users at a selected time period of the day is determined based on a second inventory of content items associated with the user at a time period preceding the selected time period, the number of content items to prefetch for the selected time period, and consumption data associated with the user for the selected time period, wherein the consumption data indicates a number of content items consumed by the user for the selected time period.

16. A non-transitory computer readable medium including instructions that, when executed by at least one hardware processor of a computing system, cause the computing system to perform a method comprising:
determining a first global constraint associated with a number of prefetches and a second global constraint associated with one or more prefetch times for a region based at least in part on a network capacity associated with the region;
determining the number of prefetches and the prefetch times at which to prefetch one or more content items to be included in feeds associated with a first group of one or more groups of users, wherein the feeds are provided by a social networking system, the first group of users is grouped based at least in part on usage patterns of the feeds associated with users of the first group of users, the number of prefetches and the prefetch times are based at least in part on the first global constraint, and the second global constraint and the prefetch times associated with the first group of users are staggered with other prefetch times associated with one or more other groups of users;
determining a number of content items to prefetch for the first group at the prefetch times, wherein the determining the number of content items to prefetch is based on integer programming; and
prefetching the one or more content items to be included in the feeds associated with the first group of users based at least in part on the prefetch times and the determined number of content items, wherein the prefetch times are prior to an expected time at which the first group of users is expected to access an application associated with the social networking system.

17. The non-transitory computer readable medium of claim 16, wherein the prefetch times at which to prefetch and the number of content items to prefetch are determined to minimize staleness of content items associated with the feeds.

18. The non-transitory computer readable medium of claim 16, wherein the prefetch times at which to prefetch are particular time periods of a day and the number of content items to prefetch is associated with the particular time periods, and wherein the day includes a plurality of time periods and the method further comprises determining a number of content items to prefetch for each time period of the plurality of time periods.

19. The non-transitory computer readable medium of claim 18, wherein the method further comprises generating a schedule associated with a user of the first group of users that includes the number of content items to prefetch for each time period of the plurality of time periods.

20. The non-transitory computer readable medium of claim 18, wherein a first inventory of content items associated with a user of the first group of users at a selected time period of the day is determined based on a second inventory of content items associated with the user at a time period preceding the selected time period, the number of content items to prefetch for the selected time period, and consumption data associated with the user for the selected time period, wherein the consumption data indicates a number of content items consumed by the user for the selected time period.

\* \* \* \* \*